United States Patent [19]

Imamura

[11] Patent Number: 5,579,114
[45] Date of Patent: *Nov. 26, 1996

[54] IMAGE SENSOR AND FACSIMILE APPARATUS INCORPORATING THE SAME

[75] Inventor: Masaya Imamura, Kyoto, Japan

[73] Assignee: Rohm Co., Ltd., Kyoto, Japan

[*] Notice: The term of this patent shall not extend beyond the expiration date of Pat. No. 5,194,725.

[21] Appl. No.: 949,139

[22] Filed: Sep. 23, 1992

[30] Foreign Application Priority Data

Sep. 25, 1991 [JP] Japan ..................................... 3-245627

[51] Int. Cl.⁶ ............................. H04N 1/024; H01J 40/14
[52] U.S. Cl. ....................... 358/482; 358/484; 250/208.1
[58] Field of Search ..................................... 358/474, 497, 358/213.11, 482, 483, 484, 213.16, 213.15, 285, 293, 294, 496, 498, 478; 250/208.1, 239, 211 R, 227.29, 238, 227.2

[56] References Cited

U.S. PATENT DOCUMENTS

| | | | |
|---|---|---|---|
| 4,839,730 | 6/1989 | Shirakoshi et al. | 358/294 |
| 4,977,313 | 12/1990 | Nagata et al. | 250/208.1 |
| 5,004,905 | 4/1991 | Yoshinouchi et al. | 250/208.1 |
| 5,038,027 | 8/1991 | Ioka | 250/208.1 |
| 5,142,137 | 8/1992 | Kushino et al. | 250/208.1 |
| 5,194,725 | 3/1993 | Sawase et al. | 250/208.1 |

*Primary Examiner*—Paul Ip

[57] ABSTRACT

An image sensor and a facsimile apparatus incorporating the same. The upper surface of a substrate with a light receiving device attached thereto is pushed upward so as to fix the substrate to a frame. Since the substrate is fixed to the frame at the upper surface of the substrate, it is easy to adjust the focus of an optical system on the light receiving portion.

36 Claims, 4 Drawing Sheets

IMAGE SENSOR AND FACSIMILE APPARATUS INCORPORATING THE SAME

BACKGROUND OF THE INVENTION

1. Field of the Invention

The present invention relates to an image sensor used for a facsimile machine, an optical character reader, etc. and a facsimile apparatus incorporating such an image sensor.

2. Description of the Related Art

A conventional image sensor is generally provided with a transparent cover attached to the upper portion of a frame so as to place an object being photographed thereon, a light emitting portion for projecting light onto the object, an optical system for receiving the light reflected from the object, and a light receiving portion for receiving the light from the optical system. The light emitting portion and the light receiving portion are provided on respective substrates which are fixed to the frame. In most image sensors, the substrate having the light emitting portion is attached to the frame in an inclined manner so as to project light onto the transparent cover obliquely, and the substrate having the light receiving portion is fixed to the lower portion of the frame so as to receive the light reflected from the object perpendicularly downward.

The substrate having the light receiving portion is attached to the frame by one of the following three methods:

(a) The upper surface (the surface on which the light receiving portion is provided) of the substrate is pushed downward by an elastic member which is provided in the frame, and the under surface (the opposite surface to the upper surface) of the substrate is pressed against the lower portion of the frame and fixed thereto.

(b) The substrate is fixed to the frame by screwing it from the under surface of the substrate. That is, the upper surface of the substrate is pressed against the frame.

(c) The under surface of the substrate is fixed to the lower portion of the frame by an adhesive.

In the method (a) of pushing the substrate downward and fixing the under surface of the substrate to the lower portion of the frame, the under surface of the substrate comes into contact with the lower portion of the frame. In other words, since the substrate is fixed to the frame at the under surface, the accuracy of the frame and the uniformity in thickness of the substrate have much influence on the focal length between the light receiving portion and the optical system, thereby making it difficult to adjust the focus on the light receiving portion, which deteriorates the picture quality when it is used for a facsimile machine or the like. In the method (c) of fixing the under surface of the substrate to the lower portion of the frame by an adhesive, since the substrate sticks to the frame, it is impossible to replace the light receiving portion.

In the case (b) of fixing the substrate to the frame by screwing it from the under surface of the substrate, since the substrate is fixed to the frame at the upper surface, although the focal distance between the light receiving portion and the optical system is slightly influenced by the accuracy of the frame, it is not in the least influenced by the thickness of the substrate, so that it is easy to adjust the focus on the light receiving portion. However, since it is necessary to form a threaded hole in the frame and to form a through hole in the substrate, not only does the cost increase but also the substrate must be increased in size in order to prevent the strength of the substrate from being reduced due to the through hole.

SUMMARY OF THE INVENTION

Accordingly, it is an object of the present invention to eliminate the above-described problems in the related art and to provide an image sensor which facilitates the adjustment of the focus of an optical system on a light receiving portion, which allows a light receiving portion to be replaced and which enables a substrate to be fixed to a frame at a low cost, and a facsimile apparatus which incorporates the image sensor.

To achieve this aim, the present invention provides an image sensor comprising an elastic member for fixing the upper surface of a substrate with a light receiving portion attached thereto to a frame. Since the upper surface of the substrate with the light receiving portion attached thereto is pressed against the upper portion of the frame by the elastic member, it is easy to adjust the focus on the light receiving portion. In addition, since the substrate is fixed to the frame by the elastic member which presses the substrate against the frame, it is possible not only to replace the light receiving portion but also to fix the substrate to the frame at a low cost.

The above and other objects, features and advantages of the present invention will become clear from the following description of the preferred embodiments thereof, taken in conjunction with the accompanying drawings.

DESCRIPTION OF THE PREFERRED EMBODIMENT

Figure 1:
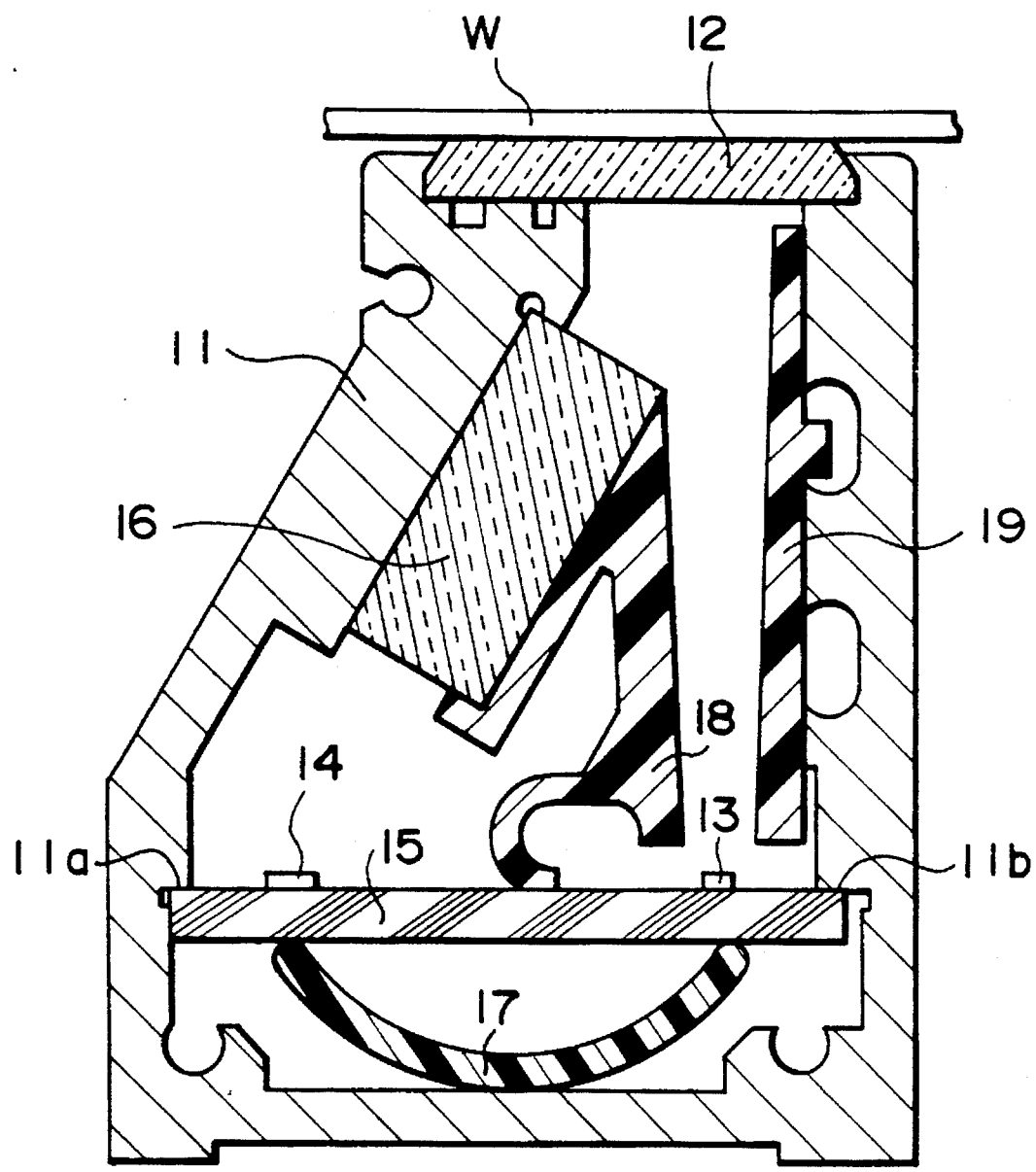
FIG. 1 is a sectional view of the main part of an embodiment of an image sensor according to the present invention.

An image sensor according to the present invention will now be explained with reference to preferred embodiments. A first embodiment of an image sensor according to the present invention is shown in FIG. 1. In this embodiment, a transparent cover (glass cover) 12 is attached to the upper portion of a frame 11. In the frame 11 are disposed a substrate 15 having a light emitting device 13 such as an LED chip as a light emitting portion, and a light receiving device 14 such as a photodiode chip as a light receiving portion, and a rod lens array 16 as an optical system for converging the light from a copy W on the glass cover 12.

The under surface of the substrate 15 is pushed upward by a curved spring 17 having a U-shaped section provided in the lower portion of the frame 11 as an elastic member so that the upper surface of the substrate 15 is pressed against protruded walls 11a, 11b formed on the inner wall of the frame 11, thereby fixing the substrate 15 to the frame 11. In this way, since the substrate 15 is fixed to the frame 11 at the upper surface of the substrate 15 having the light receiving device 14, it is easy to adjust the focus of the rod lens array 16 on the light receiving device 14 irrespective of the accuracy of the frame 11. In this embodiment, the curved spring 17 is provided not extending over the total length of the image sensor, but leaving approximately a quarter of the total length at both ends of the frame 11.

The rod lens array 16 is provided in such an inclined manner that the optical axis thereof has an oblique angle relative to the surface of the glass cover 12, and a lens supporter 18 presses the rod lens array 16 against the inner wall of the frame 11, thereby fixing the former to the latter. In order to efficiently introduce the light from the light emitting device 13 to the copy W, a light reflecting mirror 19 is provided in the frame 11, and the surface of the lens supporter 18 which opposes the light reflecting mirror 19 also has a light reflecting function.

In this image sensor, the light emitting device 13 is situated directly under the glass cover 12, and the light receiving device 14 is situated on the optical axis of the rod lens array 16. Therefore, the light emitted from the light emitting device 13 is converged by the rod lens array 16, and received and converted into an electric signal by the light receiving device 14.

Figure 2:
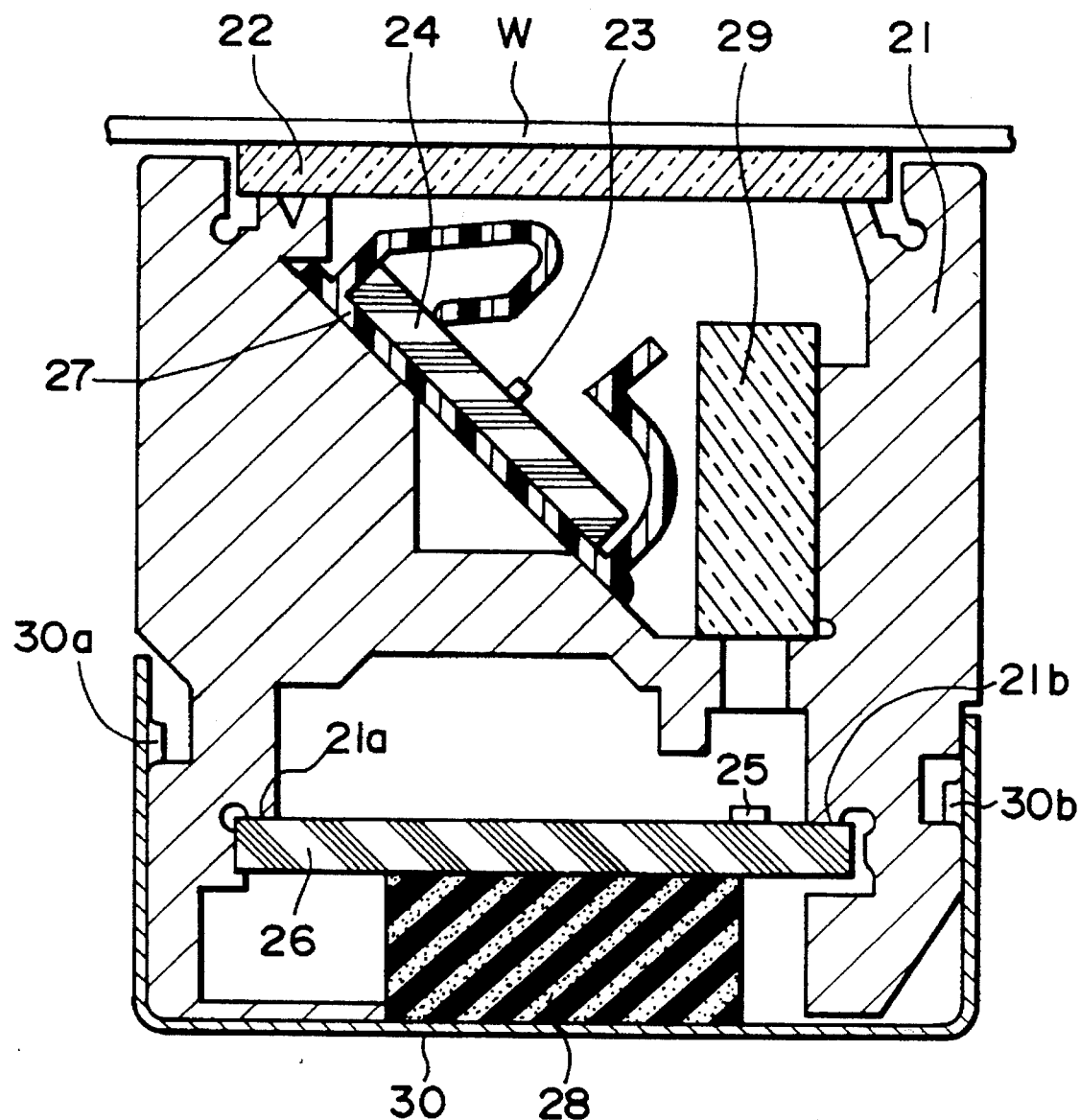
FIG. 2 is a sectional view of the main part of another embodiment of an image sensor according to the present invention.

FIG. 2 shows a second embodiment of an image sensor according to the present invention. In this embodiment, a frame 21 is fitted into a bottom case 30 having a U-shaped section and is removably engaged therewith at projections 30a, 30b. A glass cover 22 is provided at the upper portion of the frame 21. A substrate 24 having a light emitting device 23 as a light emitting portion and a substrate 26 having a light receiving device 25 as a light receiving portion are provided in the vicinity of the middle portion and at the lower portion, respectively, of the frame 21. The substrate 24 is unmovably supported by a supporting piece 27 which is attached to the frame 21. A rod lens array 29 is disposed at the middle portion of the frame 21 so as to be perpendicular to the glass cover 22 and the substrate 26, and the optical axis of the rod lens array 29 is also perpendicular thereto.

The under surface of the substrate 26 is pushed upward by a sponge 28 having a rectangular section provided at the bottom plate of the bottom case 30 as an elastic member, and the upper surface of the substrate 26 is pressed against protruded walls 21a, 21b of the frame 21, thereby fixing the substrate 26 to the frame 21. Since the substrate 26 is fixed to the frame 21 at the upper surface of the substrate 26, it is easy to adjust the focus of the rod lens array 29 on the light receiving device 25 in the same way as in the first embodiment. The sponge 28 need not be provided extending over the total length of the image sensor, and it may be provided at, for example, three portions (both ends and the central portion) of the bottom plate of the bottom case 30 at regular intervals.

In this image sensor, the light emitted from the light emitting device 23 is projected onto the copy W on the glass cover 22 at about 45 degrees with respect to the glass cover 22. The light reflected from the copy W perpendicularly to the glass cover 22 passes through the rod lens array 22, and is received and converted into an electric signal by the light receiving device 25 directly under the rod lens array 22.

In this embodiment, as the substrate 26 is pushed upward by the sponge 28 having a rectangular section provided on the bottom plate of the bottom case 30, and the bottom case 30 is removable from the frame 21, assembly of the image sensor is easy.

Figure 3:
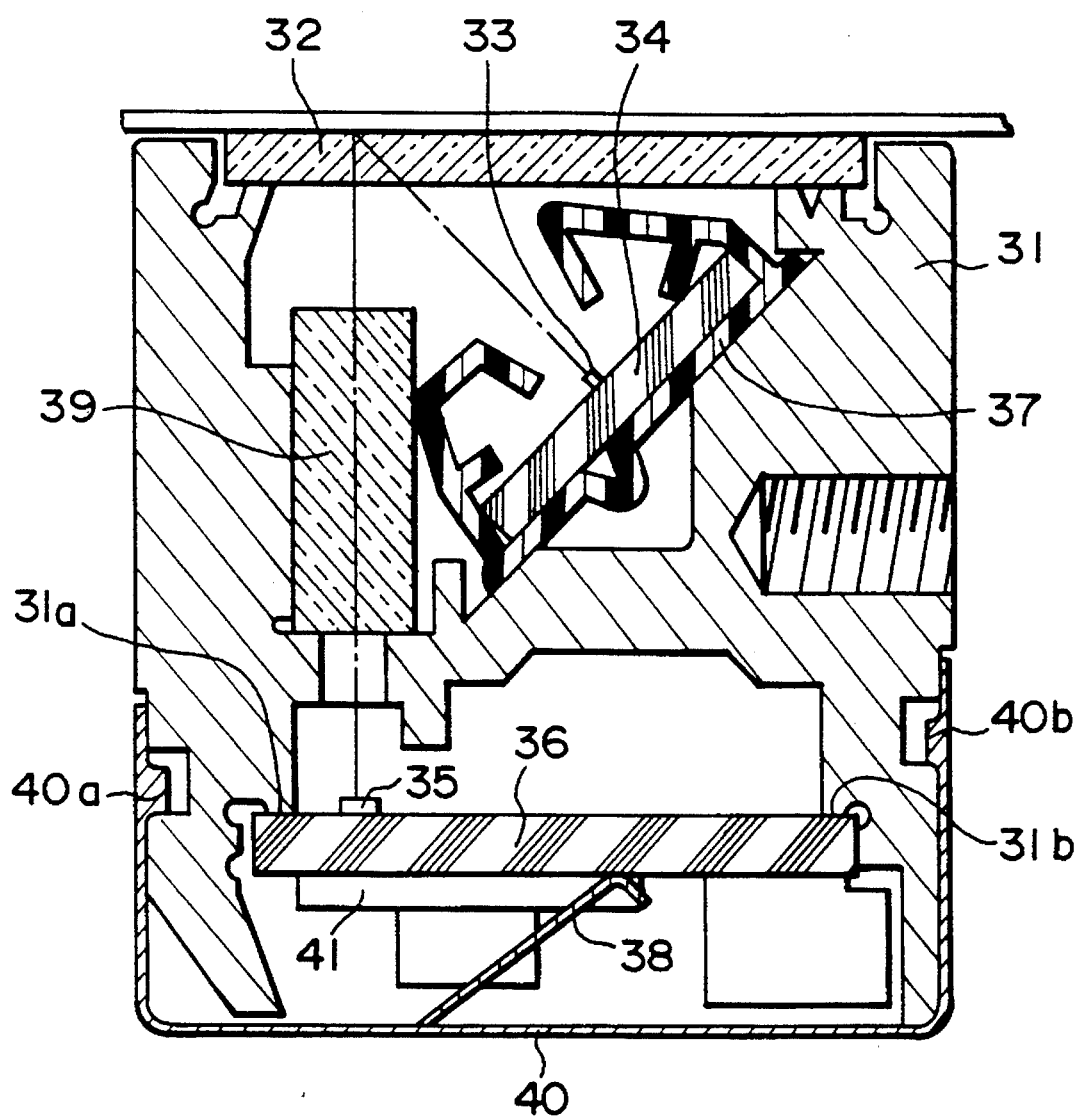
FIG. 3 is a sectional view of the main part of still another embodiment of an image sensor according to the present invention.

FIG. 3 shows a third embodiment of an image sensor according to the present invention. This embodiment has approximately the same structure as that of the second embodiment. A frame 31 is fitted into a bottom case 40 having a U-shaped section and is removably engaged therewith at projections 40a, 40b. A glass cover 32 is provided at the upper portion of the frame 31. A substrate 34 having a light emitting device 33 as a light emitting portion, a substrate 36 having a light receiving device 35 as a light receiving portion and a connector 41, and a rod lens array 39 are provided in the frame 31. The substrate 34 is unmovably supported by a supporting piece 37 which is attached to the frame 31.

The under surface of the substrate 36 is pushed upward by a leaf spring 38 provided at the bottom plate of the bottom case 40 as an elastic member, and the upper surface of the substrate 36 is pressed against protruded walls 31a, 31b of the frame 31, thereby fixing the substrate 36 to the frame 31. Since the substrate 36 is fixed to the frame 31 at the upper surface of the substrate 36, it is easy to adjust the focus of the rod lens array 39 on the light receiving device 35.

As described above, according to these embodiments, since the substrate having the light receiving device is fixed to the frame at the upper surface of the substrate, it is easy to adjust the focus of the optical system on the light receiving portion. Since the substrate is pressed against the frame by an elastic member such as a curved spring, a sponge or a leaf spring, it is easy to replace the light receiving portion, which leads to a reduction in cost.

The material of the elastic member may be selected from various materials such as resin, metal and rubber.

Figure 4:
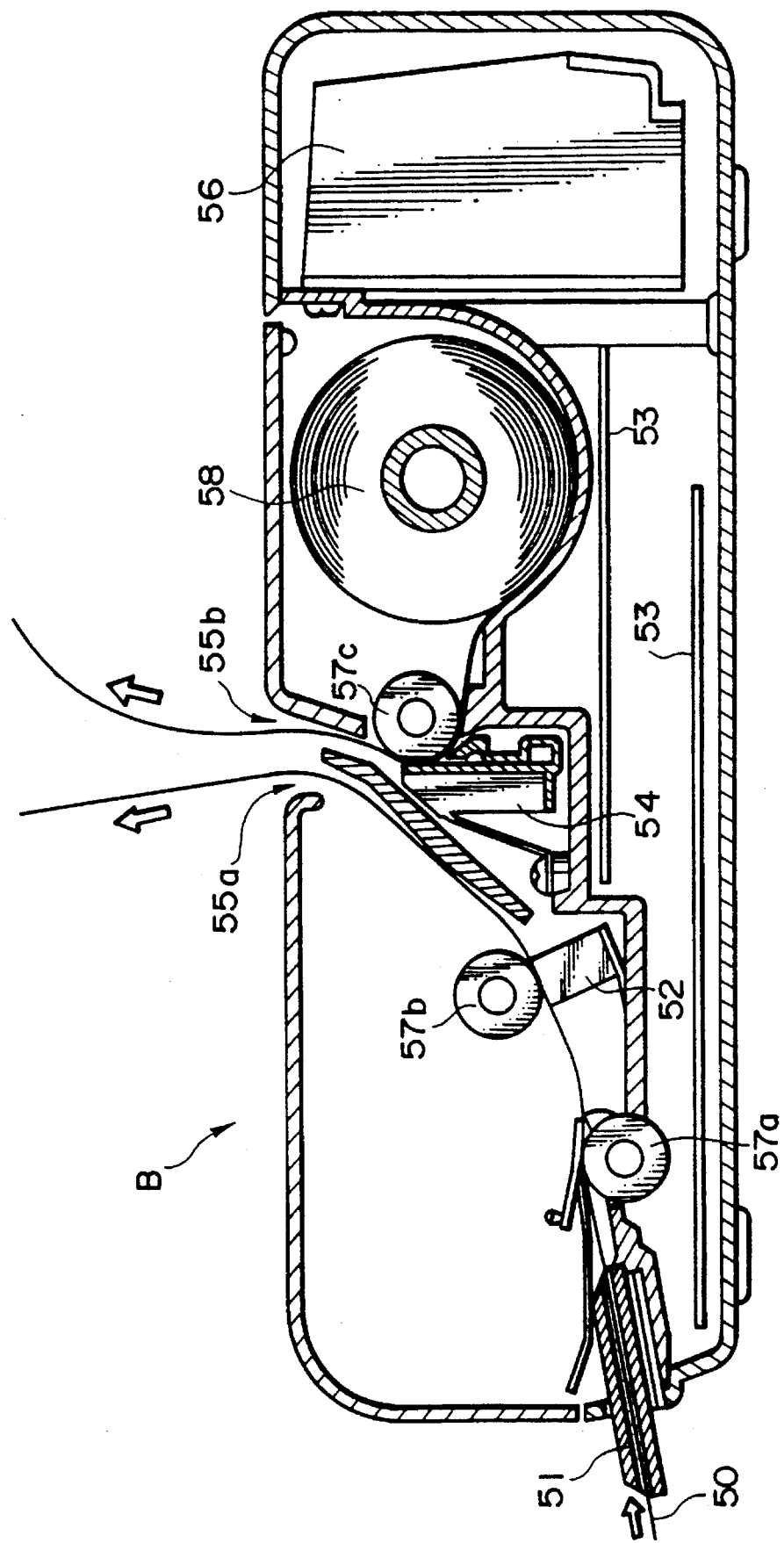
FIG. 4 is a sectional view of the main part of a facsimile apparatus with an image sensor according to the present invention mounted thereon.

FIG. 4 shows the internal structure of a facsimile machine with an image sensor having the above-described structure mounted therein.

A facsimile machine B comprises a copy supplying portion 51, an image sensor 52 as an image reader, a substrate 53 having a control portion for controlling the operation of the facsimile machine as a whole including transmission/reception, a printing portion 54, a copy discharging portion 55a, 55b and a power source 56.

The operation of the facsimile machine B will now be explained. When a copy 50 is supplied into the copy supplying portion 51, the copy 50 is transferred by platen rollers 57a, 57b. The image sensor 52 reads the image of the copy 50 and outputs the image information to the control portion in the form of an electric signal. The electric signal input to the control portion is transmitted to an external machine through a telephone line or the like. After the image of the copy 50 is read, the copy 50 is discharged from a copy discharging portion 55a.

When the control portion receives the signal transmitted from an external machine, the control portion so controls the printing portion 54 as to print the transmitted image on printing paper 58. The printed paper 58 is discharged from a copy discharging portion 55b by a platen roller 57c.

By using the image sensor of the present invention as the image sensor 52 of the facsimile machine B having the above-described structure, it is easy to read an image accurately and it is possible to obtain a good picture quality.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An image sensor for projecting light onto a surface of an article and converting the light reflected from said article into an electric signal, said image sensor comprising:

(a) a frame;

(b) a light emitting portion provided in said frame so as to project light onto the surface of said article, in order to reflect light from said article;

(c) a light receiving portion provided in said frame so as to receive light reflected from said article;

(d) an optical system provided in said frame so as to introduce said light reflected from said article to said light receiving portion;

(e) a substrate provided in said frame, having a relatively flat surface to which said light receiving portion and said light emitting portion are attached; and (f) an elastic member which is provided in said frame so as to push the upper surface of said substrate with said light receiving portion attached thereto upward and fix said substrate against said frame.

2. An image sensor according to claim 1, wherein said elastic member is a curved spring.

3. An image sensor according to claim 1, wherein said elastic member is a sponge.

4. An image sensor according to claim 1, wherein said elastic member is a leaf spring.

5. The image sensor of claim 1, wherein:
said light emitting portion includes an LED chip; and
said light receiving portion includes photodiode chip.

6. An image sensor according to claim 1, wherein said frame includes projecting portions, and said elastic member pushes said substrate such that said upper surface of said substrate is pushed up against said projecting portions to fix said substrate to said frame.

7. An image sensor for projecting light onto a surface of an article and converting the light reflected from said article into an electric signal, said image sensor comprising:

(a) a frame;

(b) a bottom plate which is engaged with said frame so as to cover the under surface of said frame;

(c) a light emitting portion provided in said frame so as to project light onto the surface of said article, in order to reflect light from said article;

(d) a light receiving portion provided in said frame so as to receive light reflected from said article;

(e) an optical system attached to said frame by a first mechanism so as to introduce said light reflected from said article to said light receiving portion; and (f) a substrate to which said light receiving portion and said light emitting portion are attached, said substrate attached to said frame by a second mechanism, said second mechanism different from said first mechanism;

said second mechanism being an elastic member which is provided between said frame and said bottom plate so as to push the under surface of said substrate and the upper surface thereof with said light receiving portion attached thereto upward and fix said substrate against said frame.

8. An image sensor according to claim 7, wherein said elastic member is a sponge.

9. An image sensor according to claim 7, wherein said frame includes projecting portions, and said elastic member pushes said substrate such that said upper surface of said substrate is pushed up against said projecting portions to fix said substrate to said frame.

10. An image sensor for projecting light onto the surface of an article and converting the light reflected from said article into an electrical signal, said image sensor comprising:

(a) a frame;

(b) a bottom plate which is engaged with said frame so as to cover the under surface of said frame;

(c) a light emitting portion provided in said frame so as to project light onto the surface of said article, in order to reflect light from said article;

(d) a light receiving portion provided in said frame so as to receive light reflected from said article;

(e) an optical system provided in said frame so as to introduce said light reflected from said article to said light receiving portion;

(f) a substrate to which only said light receiving portion and said light emitting portion are attached and which is provided in said frame; and (g) a leaf spring which is provided on said bottom plate so as to push the under surface of said substrate and the upper surface thereof with said light receiving portion attached thereto upward and fix said substrate against said frame.

11. An image sensor according to claim 10, wherein said frame includes projecting portions, and said leaf spring pushes said substrate such that said upper surface of said substrate is pushed up against said projecting portions to fix said substrate to said frame.

12. A facsimile apparatus including an image sensor for projecting light onto a surface of an article and converting the light reflected from said article into an electric signal, said facsimile apparatus comprising:

(a) a frame;

(b) a light emitting portion provided in said frame so as to project light onto the surface of said article, in order to reflect light from said article;

(c) a light receiving portion provided in said frame so as to receive light reflected from said article;

(d) an optical system attached to said frame by a first mechanism so as to introduce said light reflected from said article to said light receiving portion; and (e) a substrate to which said light receiving portion and said light emitting portion are attached, said substrate attached to said frame by a second mechanism, said second mechanism different from said first mechanism;

said second mechanism being an elastic member which is provided in said frame so as to push the upper surface of said substrate with said light receiving portion attached thereto upward and fix said substrate against said frame.

13. A facsimile apparatus according to claim 15, wherein said elastic member is a curved spring.

14. A facsimile apparatus according to claim 15, wherein said elastic member is a sponge.

15. A facsimile apparatus according to claim 12, wherein said elastic member is a leaf spring.

16. An image sensor according to claim 12, wherein said frame includes projecting portions, and said elastic member pushes said substrate such that said upper surface of said substrate is pushed up against said projecting portions to fix said substrate to said frame.

17. A facsimile apparatus including an image sensor for projecting light onto a surface of an article and converting the light reflected from said article into an electric signal, said facsimile apparatus comprising:

(a) a frame;

(b) a bottom plate which is engaged with said frame so as to cover the under surface of said frame;

(c) a light emitting portion provided in said frame so as to project light onto the surface of said article, in order to reflect light from said article;

(d) a light receiving portion provided in said frame so as to receive light reflected from said article;

(e) an optical system provided in said frame so as to introduce said light reflected from said article to said light receiving portion;

(f) a substrate to which only said light receiving portion and said light emitting portion are attached and which is provided in said frame; and (g) an elastic member which is provided between said frame and said bottom plate so as to push the under surface of said substrate and the upper surface thereof with said light receiving portion attached thereto upward and fix said substrate against said frame.

18. A facsimile apparatus according to claim 17, wherein said elastic member is a sponge.

19. An image sensor according to claim 17, wherein said frame includes projecting portions, and said elastic member pushes said substrate such that said upper surface of said substrate is pushed up against said projecting portions to fix said substrate to said frame.

20. A facsimile apparatus having an image sensor for projecting light onto the surface of an article and converting the light reflected from said article into an electrical signal, article said facsimile apparatus comprising:

(a) a frame;

(b) a bottom plate which is engaged with said frame so as to cover the under surface of said frame;

(c) a light emitting portion provided in said frame so as to project light onto the surface of said article, in order to reflect light from said article;

(d) a light receiving portion provided in said frame so as to receive light reflected from said copy;

(e) an optical system provided in said frame so as to introduce said light reflected from said article to said light receiving portion;

(f) a substrate provided in said frame, having a substantially flat surface to which said light receiving portion and said light emitting portion are attached; and (g) a leaf spring which is provided on said bottom plate so as to push the under surface of said substrate and the upper surface thereof with said light receiving portion attached thereto upward and fix said substrate against said frame.

21. An image sensor according to claim 20, wherein said frame includes projecting portions, and said leaf spring pushes said substrate such that said upper surface of said substrate is pushed up against said projecting portions to fix said substrate to said frame.

22. An apparatus for receiving light information comprising:

(a) a housing having at least a first and second surface;

(b) a substrate;

(c) one or more light emitters provided on said substrate; and (d) a compressible flexible support, disposed between said first surface and said substrate, and fixing said substrate against said second surface.

23. The apparatus of claim 22, wherein said flexible support and said substrate are located within said housing.

24. The apparatus of claim 22, wherein said flexible support is a sponge or a spring.

25. The apparatus of claim 22 further comprising:

(e) one or more light sensors provided on said substrate.

26. An apparatus according to claim 22, wherein said housing includes projecting portions, and said compressible flexible support forces a surface of said substrate against said projecting portions to fix said substrate to said housing.

27. An apparatus according to claim 22, wherein said housing includes projecting portions, and said elastic support means forces a surface of said substrate against said projecting portions to fix said substrate to said housing.

28. An apparatus for receiving light information comprising:

(a) a housing having at least a first and second surface;

(b) a substrate;

(c) one or more light emitters provided on said substrate; and (d) elastic support means, disposed between said first surface and substrate, and for fixing said substrate against said second surface.

29. The apparatus of claim 28, wherein said planar surface and said elastic support means are located within said housing.

30. The apparatus of claim 28 further comprising:

(e) one or more light sensors provided on said planar surface.

31. A method for receiving light information comprising the steps of:

(a) elastically supporting a substrate against a frame, a surface of the substrate including one or more light emitters and one or more light sensors;

(b) emitting light with said one or more light emitters to reflect the light off the surface of an article;

(c) channelling the light reflected off the surface of the article to impinge on the one or more light sensors.

32. The method of claim 31 wherein:

step (a) includes elastically supporting the substrate with a leaf spring, a curved spring or a sponge.

33. The method of claim 31 wherein:

step (a) includes elastically supporting the substrate upward against protruded walls of the frame.

34. A method for receiving light information comprising the steps of:

(a) elastically supporting a substrate against a frame, a surface of the substrate including one or more light emitters and one or more light sensors;

(b) emitting light with said one or more light emitters to reflect the light off the surface of an article;

(c) channelling the light reflected off the surface of the article with an optical system fixedly attached to the frame, such that the reflected light impinges the one or more light sensors.

35. The method of claim 34 wherein:

step (a) includes elastically supporting the substrate with a leaf spring, a curved spring or a sponge.

36. The method of claim 34 wherein:

step (a) includes elastically supporting the substrate upward against protruded walls of the frame.

* * * * *